Nov. 3, 1936.                T. H. MINCHEW                2,059,740
                             VERNIER CALIPER
                           Filed March 13, 1935

INVENTOR.
Thomas H. Minchew
BY
ATTORNEYS.

Patented Nov. 3, 1936

2,059,740

UNITED STATES PATENT OFFICE 2,059,740

VERNIER CALIPER

Thomas H. Minchew, Detroit, Mich.

Application March 13, 1935, Serial No. 10,773

3 Claims. (Cl. 33—143)

This invention relates to measuring instruments, and particularly to such instruments of the variety known as vernier calipers. A primary aim of the invention is to provide means whereby the scope and fields of usefulness of such measuring instruments may be expanded considerably. A particular object also is the provision of means incorporated in such vernier calipers whereby location and measurements may be made, within the limits of accuracy of the caliper, upon flat surfaces, and in the determination of other than outside dimensions (to which such devices are usually restricted) as in determining internal dimensions, locating holes and the like.

Another important aim is the incorporation in vernier calipers and the like of additional measuring means of the character indicated which does not interfere with the other and ordinary uses of the caliper in the determination of outside dimensions, and which additional means, further, is simple in construction and use, rugged, compact and inexpensive.

Other objects and advantages will be apparent from the following description, wherein reference is made to the accompanying drawing illustrating a preferred embodiment of my invention, and wherein similar reference numerals designate similar parts throughout the several views.

Figure 1:
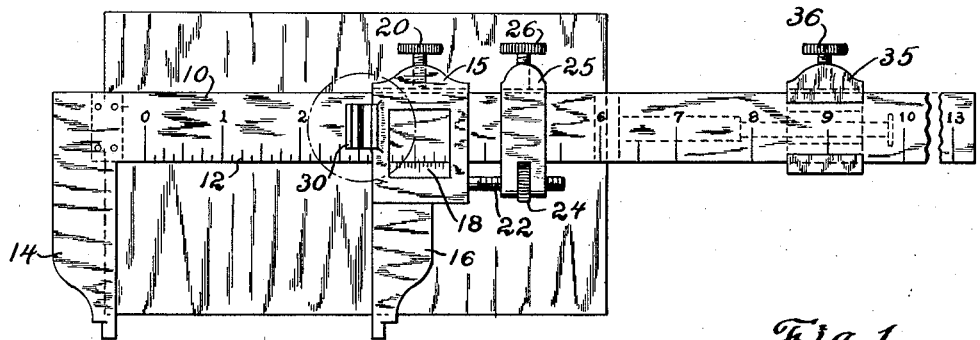
Figure 1 is a plan view of a vernier caliper incorporating the invention, showing the same in plan and indicating a typical manner of application thereof in use to work, which is also shown, as of simple block form.

Referring now to the drawing: Reference character 10 designates the frame of the caliper, which carries a true scale 12 and a fixed jaw 14, while upon the frame is mounted in the conventional fashion a slide 15 carrying a movable jaw 16 and vernier scale 18. The slide 15 may be fixed by a thumb set screw 20, and fine adjustments may be made by the traveling screw 22, projecting from the slide beneath and parallel to the scale and through an adjusting nut 24 trapped in a slot in the control slide 25. The latter is also provided with a thumb set screw 26. In these respects the caliper illustrated will be seen to be of the conventional vernier construction, although this is of course not necessarily the case. It will be observed, however, that slide 15 also carries a gauge block 30, shown as projecting from its face which carries jaw 16, but overlying the true scale. An accurate V groove 31 is centrally formed in the gauge block and occupies with respect to the accurately located face of an abutment member 33 projecting from the bottom of the gauge the same position that jaws 14—16 do to each other. The caliper reading therefore indicates also the distance between V groove 31 and the face of abutment 33. The V groove is accurately centered between the plane perpendicular inner faces of the upstanding side walls 36—37 also carried by the gauge block.

Figure 2:
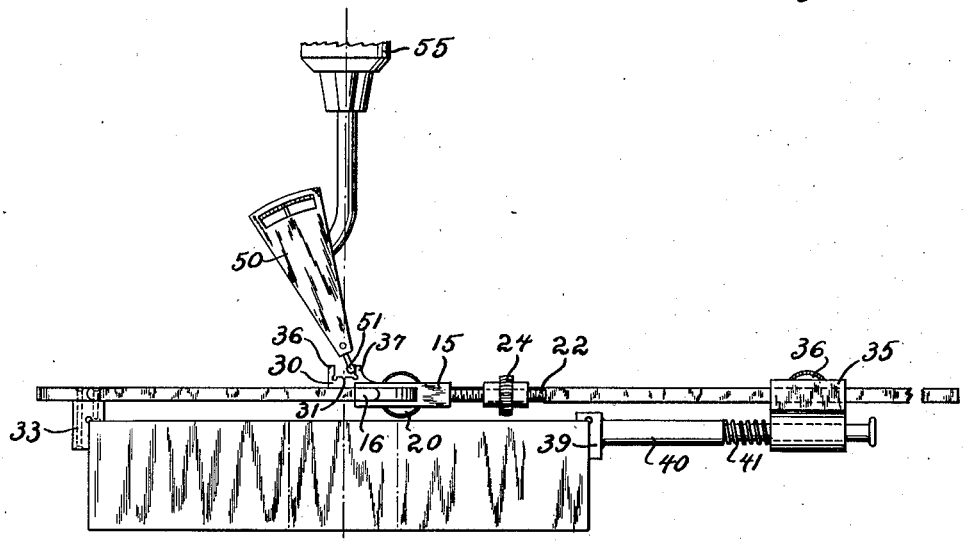
Figure 2 is a side elevation of the same, further showing, fragmentarily, the chuck of a drill press and a cooperating measuring instrument mounted in the chuck.

An additional slide 35 mounted on the caliper scale frame outside the jaws carries beneath the scale and in alignment with abutment 33 a cooperating holding abutment 39 carried by a plunger slidable in the body of slide 35 and urged toward fixed abutment 33 by a compression spring 41 trapped on the plunger between the slide and abutment 39. The slide may be locked in place by a thumb set screw 36. As shown in Figure 2, abutment 39 may in cooperation with abutment 33 act to hold the caliper upon work which is to be subjected to a surface measurement.

It will at once be apparent that in order to accurately locate a point upon the surface of work at a predetermined distance from an edge, it is merely necessary to apply abutment 33 to such edge, and adjust the caliper to the desired dimension, at which time the groove 31 will lie upon the desired line, within the limits of accuracy of the caliper. If further it is desired to adjust the block as a whole and so locate such line with respect to an outside object, such as a drill center or the like, additional gauging means may be applied to the block 30 or the V groove 31 to locate the desired line. A conventional gauging device 50 is shown mounted in the chuck 55 for this purpose, and the arm 51 of the gauge may be applied first to one and then the other of walls 36—37, until the gauge indicates equal deflection, to locate the desired line 31 with respect to the drill and chuck center. In the illustrated instance it will be seen that by turning the caliper 90 degrees upon the block, the perpendicular dimension may be similarly located to complete the location of a point. Although as herein described the location of such point is considered to be for the purpose of a drilling operation, it will be seen that the uses of my improved measuring instrument are wellnigh unlimited, and entirely independent of the operation intended to be performed upon the work.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In a measuring instrument including a body portion, a slide movable therealong, fixed and movable jaws carried by the body portion and slide, scale means for determining the relative positions of said jaws including indicia carried by the body and by the slide, fixed abutment carried by the body portion upon one side thereof, and a cooperating abutment carried by the slide upon the other side of the body portion, said last mentioned abutment being so positioned relatively to the indicia carried by the slide that its position with relation to the additional fixed abutment may also be determined by said indicia, common indicia carried by the movable jaw and cooperating with said scale for determining the relationship between the fixed and movable jaws and between the fixed and cooperating abutments, a holding abutment carried upon the same side of the body portion as said additional fixed abutment and movable toward and from the same, and means yieldably projecting said holding abutment toward said additional fixed abutment.

2. A measuring instrument as set forth in claim 1 in which the scale means includes indicia extending along one side of the body and the cooperating abutment carried by the slide overlies the scale, the additional fixed abutment projecting from the opposite side of the body, and in which the jaws lie substantially in the plane of the scale.

3. In a vernier caliper including fixed and movable work-engaging jaws and a measuring scale for determining the relative location of the movable jaw with respect to the fixed jaw, additional work-engaging means including a fixed abutment projecting laterally from one side of the scale and a cooperating abutment carried by and movable as a unit with said movable jaw and arranged upon the other side of the scale, said cooperating abutment and movable jaw being spaced from each other similarly to the relative spacing of the fixed jaw and fixed abutment, and common indicia carried by the movable jaw and cooperating with said scale for determining both the relationship between the fixed and movable jaws and the relationship between the fixed and cooperating abutments.

THOMAS H. MINCHEW.